US010639577B1

(12) United States Patent
Wilson, Jr. et al.

(10) Patent No.: US 10,639,577 B1
(45) Date of Patent: May 5, 2020

(54) CLOGGED DUST FILTER MONITOR

(71) Applicant: FILTERSMARTS, INC, Hunstville, AL (US)

(72) Inventors: David Joel Wilson, Jr., Huntsville, AL (US); Douglas Morris, Huntsville, AL (US); David Daniel Walker, Decatur, AL (US)

(73) Assignee: Filtersmarts, Inc, Huntsville, AL (US)

( * ) Notice: Subject to any disclaimer, the term of this patent is extended or adjusted under 35 U.S.C. 154(b) by 0 days.

(21) Appl. No.: 16/251,060

(22) Filed: Jan. 17, 2019

Related U.S. Application Data

(60) Provisional application No. 62/618,594, filed on Jan. 17, 2018.

(51) Int. Cl.
| | |
|---|---|
| *B01D 46/00* | (2006.01) |
| *B01D 46/42* | (2006.01) |
| *F24F 11/39* | (2018.01) |
| *G01N 21/59* | (2006.01) |
| *G01N 21/01* | (2006.01) |
| *G01N 21/17* | (2006.01) |

(52) U.S. Cl.
CPC ....... *B01D 46/0086* (2013.01); *B01D 46/429* (2013.01); *B01D 46/4245* (2013.01); *F24F 11/39* (2018.01); *B01D 2273/18* (2013.01); *B01D 2273/26* (2013.01); *G01N 2021/0168* (2013.01); *G01N 2021/1772* (2013.01); *G01N 2021/5965* (2013.01)

(58) Field of Classification Search
CPC .. B01D 46/0086; B01D 46/442; B01D 46/46; B01D 2273/18; B01D 2273/26; B01D 46/4245; B01D 46/429; F24F 11/39; G01N 2021/0168; G01N 2021/1772; G01N 2021/5965
See application file for complete search history.

(56) References Cited

U.S. PATENT DOCUMENTS

| | | | | |
|---|---|---|---|---|
| 3,985,528 | A * | 10/1976 | Revell | B01D 46/18 55/352 |
| 4,304,492 | A * | 12/1981 | Fox | B01D 46/0005 250/573 |
| 5,141,309 | A * | 8/1992 | Worwag | A47L 9/19 356/72 |
| 5,828,458 | A * | 10/1998 | Taylor | G01N 21/532 356/440 |
| 7,012,685 | B1 * | 3/2006 | Wilson | B01D 46/0086 356/239.1 |
| 8,744,780 | B2 * | 6/2014 | Wilson, Jr. | G01N 21/59 356/239.1 |
| 9,061,229 | B1 * | 6/2015 | Wilson, Jr. | G01N 21/59 |
| 2010/0313748 | A1 * | 12/2010 | Schluter | B01D 46/46 95/25 |
| 2013/0289919 | A1 * | 10/2013 | Wilson, Jr. | G01N 21/59 702/104 |

\* cited by examiner

*Primary Examiner* — Robert Clemente
(74) *Attorney, Agent, or Firm* — Alexandros Diamantis

(57) ABSTRACT

A clogged filter detector is provided. In some embodiments, the clogged filter detector may comprise a transmitter, a sensor, and a transmitter resistor array configured to modify the output strength of the transmitter. In some embodiments, the clogged filter detector may comprise a transmitter, a sensor, and a sensor resistor array to configured to adjust the strength of the signal output by the sensor. The clogged filter detector may also include one or more processor configured to adjust the strength of a beam output by the transmitter based on a saturation level.

24 Claims, 10 Drawing Sheets

| Mylar layers | 20.1k | 10k | 1k | 100 | 10 |
|---|---|---|---|---|---|
| 0 | | | | | 146 |
| 1 | | | | 782 | 114 |
| 2 | | | | 695 | 96 |
| 3 | | | | 638 | 78 |
| 4 | | | | 562 | 58 |
| 5 | | | | 486 | 45 |
| 6 | | | | 368 | 31 |
| 7 | | | | 274 | 19 |
| 8 | | | | 205 | 9 |
| 9 | | | | 159 | 6 |
| 10 | | | | 121 | 2 |
| 11 | | | | 96 | 1 |
| 12 | | | 775 | 71 | |
| 13 | | | 649 | 58 | |
| 14 | | | 506 | 43 | |
| 15 | | | 423 | 34 | |
| 16 | | | 358 | 24 | |
| 17 | | | 282 | 19 | |
| 18 | | | 211 | 11 | |
| 19 | | | 178 | 7 | |
| 20 | | | 136 | 4 | |
| 21 | | | 113 | 3 | |
| 22 | | 852 | 84 | 1 | |
| 23 | | 686 | 73 | 0 | |
| 24 | | 553 | 59 | | |
| 25 | | 504 | 43 | | |
| 26 | 641 | 410 | 32 | | |
| 27 | 544 | 318 | 27 | | |
| 28 | 474 | 278 | 19 | | |
| 29 | 354 | 206 | 13 | | |
| 30 | 285 | 148 | 8 | | |
| 31 | 231 | 128 | 6 | | |
| 32 | 182 | 94 | 5 | | |
| 33 | 155 | 80 | 1 | | |
| 34 | 113 | 65 | | | |
| 35 | 79 | 46 | | | |
| 36 | 64 | 40 | | | |
| 37 | 49 | 33 | | | |
| 38 | 35 | 24 | | | |
| 39 | 26 | 19 | | | |
| 40 | 22 | 14 | | | |
| 41 | 14 | 8 | | | |
| 42 | 8 | 5 | | | |
| 43 | 4 | 1 | | | |
| 44 | 1 | 0 | | | |
| 45 | 0 | | | | |

FIG. 10

CLOGGED DUST FILTER MONITOR

CROSS-REFERENCE TO RELATED APPLICATIONS

This application is a non-provisional application claiming the benefit of U.S. Provisional Utility Patent Application No. 62/618,594, filed 2018 Jan. 17, which is herein incorporated by reference.

FIELD OF THE INVENTION

This patent specification relates to the field of dust filter monitors. More specifically, this patent specification relates to dust filter monitors configured to detect the clogging level of a dust filter.

BACKGROUND

Filters for heating, ventilation, and air conditioning (HVAC) systems play an important role by minimizing deposits of dust and other particles on cooling coils and heating surfaces. Deposits of dust or other materials on cooling coils and heating surfaces reduce the efficiency, and therefore increase the energy needed to operate the HVAC system. A clogged filter can result in decreased air flow over cooling coils and heating surfaces, and decreased air flow also lowers efficiency and can shorten the life of a HVAC system because the HVAC system has to run longer to maintain the desired temperature.

After a period of use, dust accumulates on the filters, causing them to become clogged and requiring additional energy consumption. At some point, it becomes cost-effective to remove the filter and either clean it or replace it with a new one. HVAC equipment manufacturers typically state their warranties so that the user, not the manufacturer, is responsible for equipment failures due to neglect in maintaining the system. Manufacturers typically emphasis maintenance of the dust filters. In most cases, the manufacture does not have access to an operating HVAC system unless called by the user, so it is not practical for a manufacturer to be responsible for filter maintenance. It often takes weeks or months before an air filter needs to be cleaned or replaced, and the long periods of time and lack of constant attention can result in users neglecting air filter maintenance.

Many newer, high efficiency air-conditioners and heat pumps now use variable speed fan motors (ECM—Electronically Commutated Motors) which attempt to achieve constant, optimized flow through the dust filter and AC or heat pump coils, even as dust gradually clogs the filter. The filter can, never-the-less, eventually clog sufficiently that the air flow decreases. The increased fan motor power required to draw air through the clogging filter decreases the HVAC efficiency. Decreasing flow across the coils below the optimum flow rate also decreases the system efficiency. Increases in run time due to the clogged filter can both 1) increase energy requirements (decrease efficiency) and 2) decrease system lifetime, because HVAC system lifetime approximates inverse proportionality to system run-time.

In recent years, the lower costs and increased accuracies of differential pressure switches have led to their more frequent application for monitoring the clogging of dust filters. These instruments monitor differential pressure between the input and output sides of the filter. When the differential pressure reaches a predetermined level, an alarm is triggered which indicates the filter is clogged. Problems can occur from opening/closing of doors between rooms or other actions modifying ambient room pressure. A filter manufacturer has recently offered filters with disposable differential pressure sensors built into their upper end filters. Any ducting leaks, quite normal in older systems, also leads to a) increased flow of non-filtered (filter bypass) air and b) sometimes, draw of crawl space or attic air into the ducting as the filter becomes clogged. With increase dust loading and clogging of the dust filter, the filter will often physically warp so that air flows around the filter; i.e., a filter bypass air-flow path is created until the filter is cleaned or replaced.

An electro-optical dust filter sensor/alarm offers advantages over the differential pressure sensor in that it is not affected by the flow across the filter or by the speed of the HVAC fan motor. Since the invention of dust filters, the "eyeball" (visually examining the dust/dirt build-up on the filter's leading edge) has been the traditional means of determining when the filter needs replacing or cleaning. Timing for these eyeball examinations is often left to the memory of the user, which may be aided by such things as a calendar date (i.e., the first of each month) or a run-time clock.

Some electro-optical based clogged dust filter detectors are designed for use with low optical density filter media. However, a filter detector which functions with filters designed for smaller (sub-micron) particle removal is desirable. These filters are necessarily more optically dense than traditional low optical density filter media, and therefore require an optical filter detector that has increased optical sensitivity.

One example of an optical filter detector comprises a simple light emitting diode (LED) coupled to a receiving photo-diode (or photo-transistor) with a simple signal processor. This filter detector may perform the required task with the lower cost, lower optical density, lower MERV (minimum efficiency reporting value) rated dust filters. However, as the filters become more optically dense to remove smaller (few micron to submicron) particles (i.e., filters with higher MERV values), the simple optical transmitter/sensor electro-optical filter detectors are not sufficient.

The cheaper, lower MERV filters typically either have no pleats or pleats with a spacing of 1 to 2 pleats (folds) per inch; at least some of the high MERV filters are manufactured with a pleat spacing of up to 8 pleats per inch. Thus, the high MERV filters are more optically dense, especially when viewing across (i.e., perpendicular to) the pleats. Therefore, the basic electro-optical system described above may not be suitable with the high MERV, optically dense filters such as the 3M® Filtrete® 1500, 1700 or 1900 brand or equivalent DuPont® filters. As stated above, high MERV filters remove a greater percentage of small (micron and submicron) particles than the cheaper filters. This is especially important for people with allergies or in clean room or sterile hospital situations requiring "clean air".

In order to operate with higher MERV, high efficiency (from small particle collection standpoint) filters, the filter detector must thus have adequate sensitivity to function with optically dense filter media. Also, since HVAC dust filters are often located in hallways with no available electrical power, a long-life, battery-powered filter detector can be desirable.

Filters can be used for a wide variety of purposes other than the HVAC systems discussed above. For example, filters are used to control incoming dust and outgoing paint particles for paint spraying operations. They are also used to control dust accumulation on electronic components for ventilated electronics enclosures such as those used by cable television companies on the side of the street. The clean environment used in fabrication of micro-electronic chips typically requires a filtered air source. Very clean (filtered) air is also required for some medical applications. These filter uses can all be referred to as HVAC (heating, ventilation and air-conditioning) applications.

Since the filter maintenance requirement is environment driven rather than time driven, a clogged filter sensor is helpful in maintaining HVAC system optimal operating efficiency. A system that notified the user when an air filter needed attention can minimize energy losses and decreased performance resulting from clogged air filters.

SUMMARY

In some embodiments, a clogged filter detector may comprise a transmitter configured to emit a beam of electromagnetic radiation, a sensor configured to receive the beam after the beam has passed through the filter, and a transmitter resistor array comprising a plurality of resistors and configured to adjust an output strength of the transmitter by selectively controlling one or more of the plurality of resistors.

In some embodiments, a clogged filter detector may comprise a transmitter configured to emit a beam of electromagnetic radiation, a sensor configured to receive the beam after the beam has passed through the filter, and a sensor resistor array comprising a plurality of resistors, and configured to adjust the strength of a signal output by the sensor by selectively controlling one or more of the plurality of resistors.

In some embodiments, a clogged filter detector may comprise a transmitter configured to emit a beam of electromagnetic radiation, a sensor configured to receive the beam after the beam has passed through the filter, and one or more processor configured to adjust an output strength of the beam of electromagnetic radiation based on a saturation level of the sensor

BRIEF DESCRIPTION OF THE DRAWINGS

Some embodiments of the present invention are illustrated as an example and are not limited to the figures of the accompanying drawings, in which like references indicate similar elements in which:

FIG. 10 is a chart of experimental results based on differing sensor resistor array impedances and layers of Mylar.

DESCRIPTION OF THE EXEMPLARY EMBODIMENTS

Figure 1:
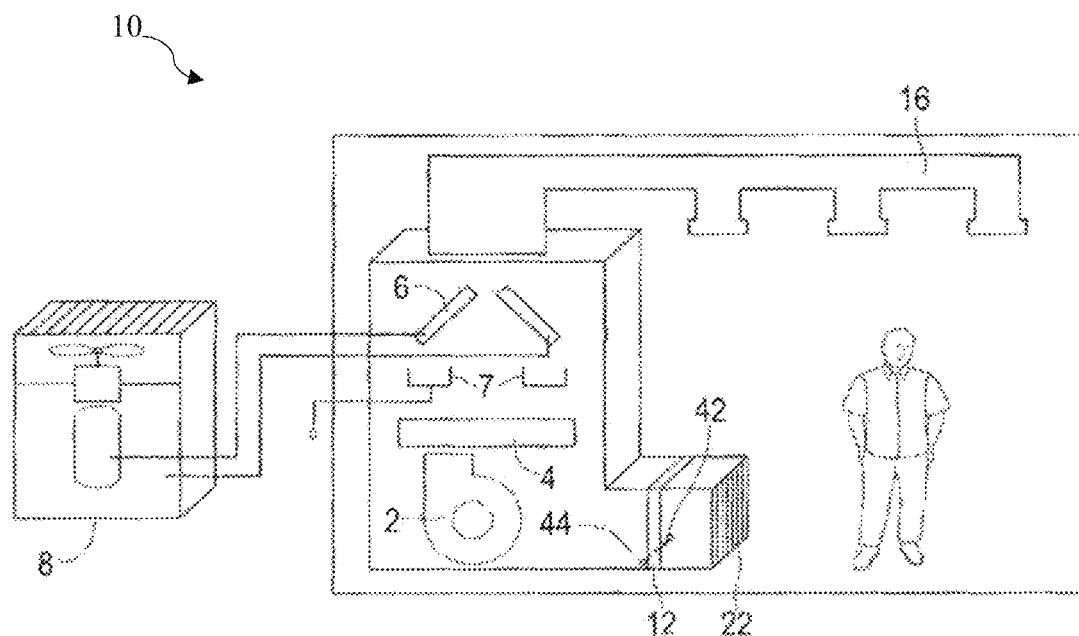
FIG. 1 depicts an embodiment of a heating, ventilation, and air conditioning (HVAC) system.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

For purposes of description herein, the terms "upper", "lower", "left", "right", "rear", "front", "side", "vertical", "horizontal", and derivatives thereof shall relate to the invention as oriented in figures. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

New dust filter monitoring devices are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

The present invention will now be described by example and through referencing the appended figures representing preferred and alternative embodiments.

HVAC System

Figure 2:
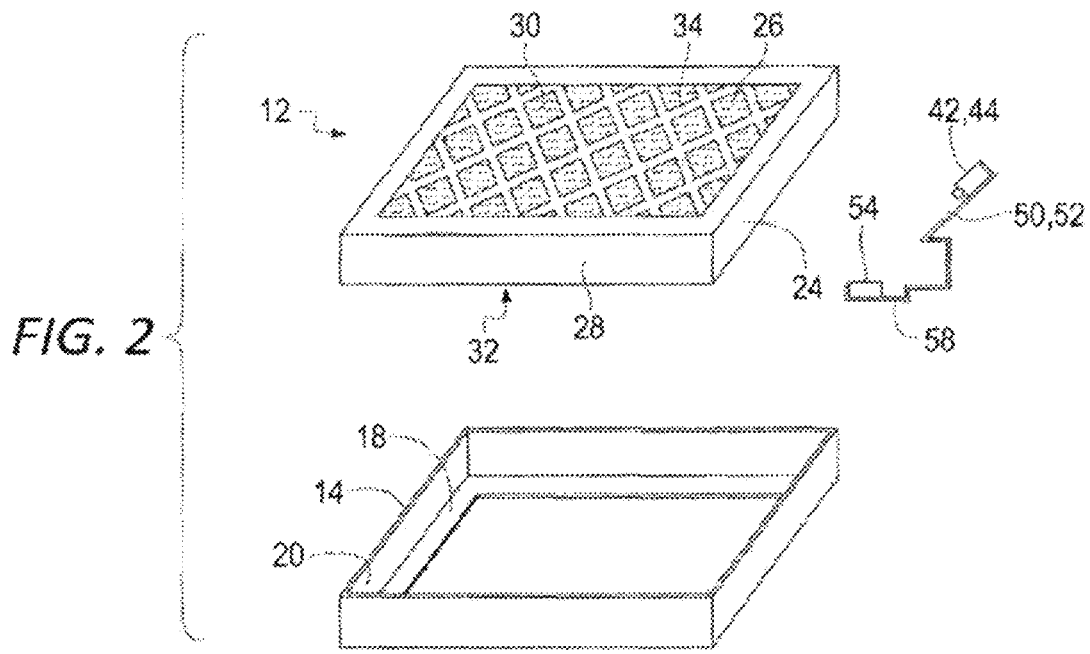
FIG. 2 is a perspective view of an embodiment of a filter, filter receptacle, and transmitter and sensor brackets.

A heating, ventilation, and air conditioning (HVAC) system 10 may include a filter 12 positioned in a filter receptacle 14, as seen in FIGS. 1 and 2. The filter 12 and associated filter receptacle 14 are often positioned in a duct 16 or plenum of an HVAC system 10. The HVAC system 10 may also include a blower 2, a heating surface 4, cooling coils 6, a drain pan 7, a compressor 8, return and supply vents, a filter receptacle 14, ducts 16, and other components. The filter receptacle 14 is often positioned in a return duct, and can include a filter receptacle ledge 18 that supports the filter 12 and prevents it from being drawn into the HVAC return ducts. The filter receptacle 14 also can include filter receptacle side plates 20, which can be perpendicular to the filter receptacle ledge 18. The filter receptacle side plates 20 are close to the edges of the filter 12, and help force returning air through the filter 12 instead of going around the filter 12. There can be a grill 22 positioned over the filter receptacle 14, where the air passes through the grill 22 before passing through the filter 12. The grill 22 can isolate and protect the filter 12 from a living area.

The filter 12 itself can have an external frame 24 that supports a filter body 26. The filter body 26 can be a mat, a flat sheet, a pleated sheet, a plurality of stacked sheets, or a wide variety of other shapes and configurations. The filter 12 has a filter edge 28, which is often the outer portion of the external frame 24, and the filter 12 also has a filter top surface 30 opposite a filter bottom surface 32. The filter body 26 can be held in place by the external frame 24, or by a filter support 34, or the filter body 26 may be self-supporting. The filter support 34 can be a lattice system of paper, paperboard, metal, or other materials, or it can be netting or other materials positioned over, under, and/or around the filter body 26. The filter support 34 can help hold the filter body 26 together, or just add strength and durability to the filter 12 as a whole. The filter 12 is often a rectangular cube, in which case it has a filter edge 28 with four different surfaces and a filter top surface 30 opposite a filter bottom surface 32. However, other filter shapes are possible, such as discs, triangles, cylinders, or almost any shape.

During use, the HVAC system 10 forces air through the filter 12, and the air flow is typically perpendicular to the filter top surface 30 and the filter bottom surface 32. In other embodiments, air flow can impact a filter 12 at various angles, particularly if the filter receptacle 14 is close to a bend or corner in the duct 16. The air flow typically enters the filter body 26 from the filter top surface 30, and exits the filter body 26 from the filter bottom surface 32. Dust and other particulate matter gradually accumulate on the filter top surface 30 and throughout the filter body 26, and the accumulating dust slowly clogs the filter 12. The filter 12 resists air flow more and more as dust accumulates in the filter 12, and the accumulated dust actually serves to filter more dust from the returning air. Therefore, a dirty filter 12 may clog more rapidly than a clean filter 12, and the rate of clogging can increase over time.

Clogged Filter Detector

Figure 3:
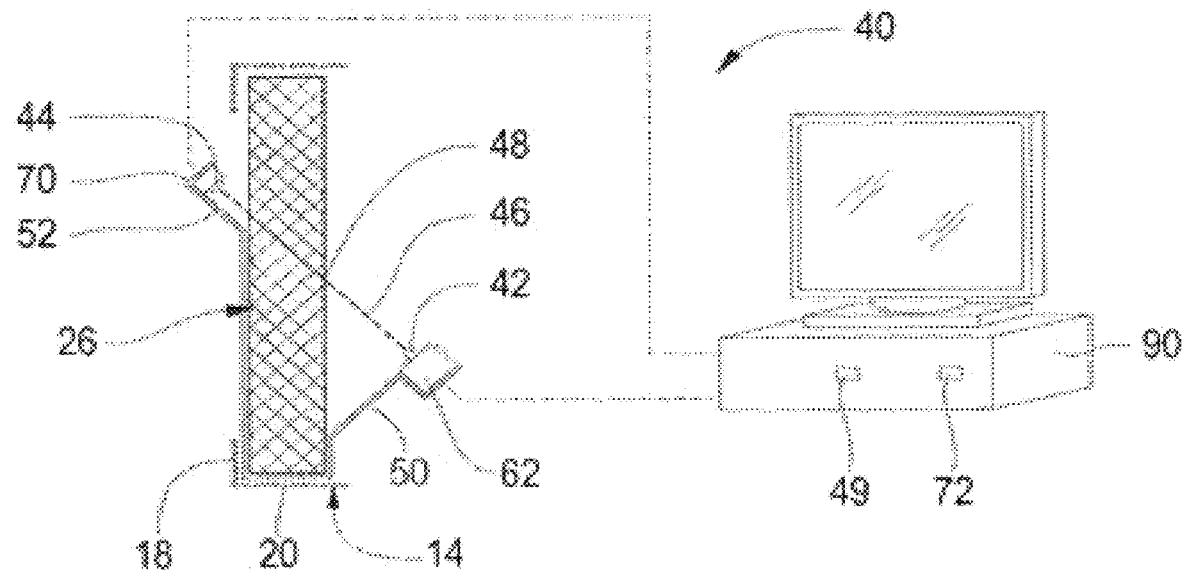
FIG. 3 is a side view of an embodiment of filter detector and a computer.
Figure 4:
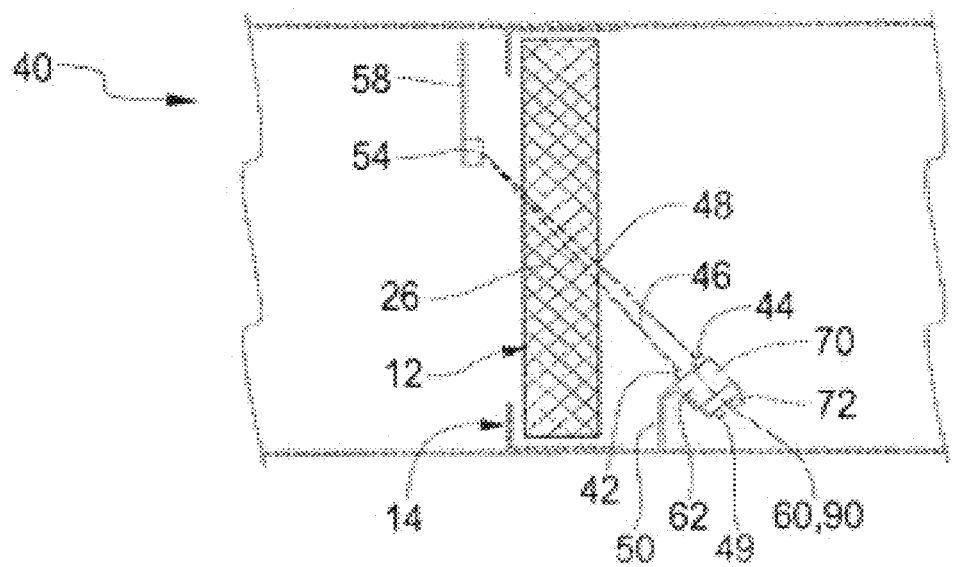
FIG. 4 is a side view of an embodiment of a filter detector with reflector bracket.

The embodiment of the clogged filter detector 40 shown in FIGS. 3 and 4 and described herein can be used for HVAC systems 10, but it can also be used for many other applications. This includes, but is not limited to, filters 12 for paint spraying systems, ventilated electronic enclosures, clean rooms for dust sensitive manufacturing operations or other dust sensitive needs, and most other uses that requires filters to reduce the dust entrained in air or other gases. This description is primarily directed towards a HVAC system 10, but it should be understood that this is just one possible use of the clogged filter detector 40, and this description is intended to address systems other than HVAC systems 10, as will be understood by one skilled in the art.

An embodiment of a filter detector 40 may comprise a transmitter 42 and a sensor (e.g., receiver) 44, as exemplified in FIGS. 3 and 4, and with continuing reference to FIGS. 1 and 2. The transmitter 42 emits a beam 46 of electromagnetic radiation, such as infra-red light, near infra-red light, visible light, or other frequencies of electromagnetic radiation. The transmitter 42 may emit one frequency, or a limited range of frequencies, of electromagnetic radiation. The transmitter 42 can be a light emitting diode, a laser, or other sources of electromagnetic radiation.

In some embodiments, the sensor 44 produces an electrical current when contacted by electromagnetic radiation, and the strength of the electrical current increases as the sensor 44 is contacted by more electromagnetic radiation. The sensor 44 can be a photo diode or a photo resistor, but other sensors known to those skilled in the art are also possible. The sensor 44 may be sensitive to a specific frequency or range of frequencies of electromagnetic radiation, so that the sensor 44 only generates an electrical current when contacted by certain frequencies or a certain range of frequencies of electromagnetic radiation. The response of the sensor 44, or the strength of the electrical current produced per quantity of received electromagnetic radiation, is also dependent on the frequency of the electromagnetic radiation.

Matching the frequencies of the transmitter 42 and the sensor 44 can improve the overall sensitivity of the filter detector 40. One frequency of electromagnetic radiation has a set wavelength, and preferably the peak wavelength at which the transmitter 42 emits electromagnetic radiation is within 200 nanometers of the peak sensitivity of the sensor 44, and more preferably the peak wavelength at which the transmitter 42 emits electromagnetic radiation is within 50 nanometers of the peak sensitivity of the sensor 44. In various embodiments, the peak transmitter frequency and the optimal sensor frequency are in the infra-red range, the near infra-red range, the visible light range, or other frequency ranges.

The transmitter 42 emits a beam 46 of electromagnetic radiation, and this beam 46 can be directed at the filter 12 such that the beam 46 strikes the filter 12 at a measurement point 48. The sensor 44 can be positioned so this beam 46 strikes the sensor 44 after the beam 46 strikes the measurement point 48 and passes through the filter 12. As dust and other particulates accumulate on the filter 12, the strength of the beam 46 which passes through the filter 12 and strikes the sensor 44 decreases, because the increasing accumulation of dust and other particulates increasingly block the beam 46. Therefore, the amount of dust accumulation on the filter 12 can be measured by recording the amount of electrical current produced by the sensor 44 when the filter 12 is clean, and comparing that to the amount of electrical current produced by the sensor 44 as the filter 12 gradually accumulates dust.

Figure 5:
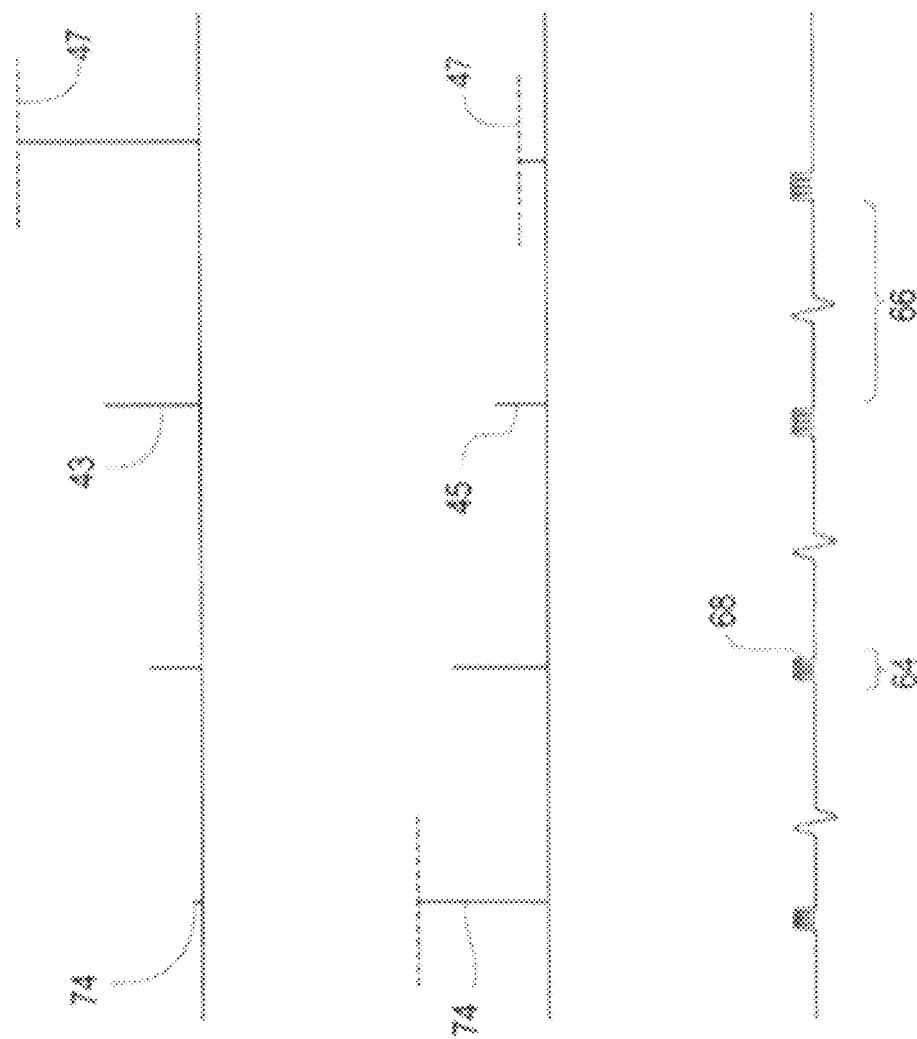
FIG. 5 depicts a series of graphs showing, from the bottom up, the pulsing of a transmitter over a period of time, a sensor reading, and a determined clogging level.

To simplify terminology, a "sensor reading" 45 is defined as a measurement of the amount of electrical current produced by the sensor 44, especially when the transmitter 42 is transmitting a beam 46 of electromagnetic radiation. A "clogging level" 43 is defined as a percentage based on the number 1 minus the ratio of the current sensor reading 45 divided by the sensor reading 45 when the filter 12 was new or freshly cleaned. One example of sensor readings 45 are shown in FIG. 5, with continuing reference to FIGS. 1-4.

There is no exact amount of dust that clogs a filter 12, but the filter detector 40 can use a set clogged level 47 as the clogging level 43 that defines when a filter 12 is clogged. Therefore, the set clogged level 47 is the percentage reduction of the sensor reading 45 over time that is used to notify the user when the filter 12 is clogged. The filter detector 40 can also include a physical (or software) alarm sensitivity adjustment 49 which can be used to adjust or change the set clogged level 47, and the alarm sensitivity adjustment 49 can be positioned in a wide variety of locations on the filter detector 40 so as to be convenient for the user. For example, the alarm sensitivity adjustment 49 (as well as any other operating controls) can be positioned with the transmitter 42, the sensor 44, on a bracket, or even remotely, such as with a remote computer or other related electronic device.

The transmitter 42 can be held in place by a transmitter bracket 50, and the sensor 44 can be held in place by a sensor bracket 52. The transmitter bracket 50 and the sensor bracket 52 can be connected to the filter receptacle 14 to hold them in place when the filter 12 is removed for cleaning or replacement. In other embodiments, the transmitter bracket 50 and/or the sensor bracket 52 can be connected to the filter 12 itself, the walls of the duct 16, the grill 22, or to any other structure that can secure the transmitter 42 and sensor 44 in the proper positions The transmitter and sensor brackets 50, 52 may hold the transmitter 42 and sensor 44 in a position that is mis-aligned with the air flow through the filter 12 at the measurement point 48, so that the transmitter 42 and sensor 44 do not block air flow at the measurement point 48. Air carries entrained dust to the filter 12, and this entrained dust gradually accumulates on the filter 12. The dust accumulation is measured at the measurement point 48, so air flow at the measurement point 48 should be representative of the entire filter 12. Dust accumulation is measured at this filter surface measurement point 48 and also within the filter body 26 along the optical path of the beam 46 between the transmitter 42 and sensor 44. Blocking air flow to the measurement point 48 would reduce the amount of dust accumulation at the measurement point 48. Therefore, aligning the sensor 44 or transmitter 42 with the air flow through the filter at the measurement point 48 could result in an inaccurate filter detector 40 because the filter detector 40 would not accurately measure the total dust accumulation on the largest part of the filter 12 where air flow is not obstructed. This misalignment is not necessary for thicker (for example, >6 cm) filters, since air flow shadows will likely be overcome by air turbulence over this distance.

In some embodiments, the transmitter 42 and the sensor 44 may be aligned along the flow of air, if there is a sufficient enough spacing between the transmitter 42 and the sensor 44 such that they do not substantially create an air flow shadow section at the measuring point 48. However, in some circumstances, an air flow shadow section may be tolerated if portions of the filter 12 are able to reach a sufficient clogging level that the air would flow through the shadowed section once the other sections have become clogged. However, this may not be possible in many HVAC systems 10 as the non-shadowed sections may not be sufficiently clogged to allow the air to flow through the shadowed sections and thus to detect a representative clogging level of the filter 12 when the filter 12 is nearing its clogged level.

If the air flow is perpendicular to the filter top surface 30, the transmitter 42 can be held at a position over the filter top surface 30 or adjacent to the filter top surface 30 with the beam 46 directed at an acute angle toward the filter top surface 30. This secures the transmitter 42 to the side of the air flow through the measurement point 48, so the air flow through the measurement point 48 is not obstructed. The sensor 44 can then be positioned in line with the beam 46 so the sensor 44 can also be positioned to the side of the air flow through the measurement point 48. The transmitter 42 and sensor 44 are then mis-aligned (for thinner filters) with the air flow through the filter 12 at the measurement point 48 because the transmitter 42 and sensor 44 are to the side of the air flow path through the measurement point 48 on the filter 12. There is frequently limited space in and around the filter receptacle 14 to mount the filter detector 40, so the transmitter 42 and sensor 44 may have to be close to the surface of the filter 12. This close positioning may increase the importance of mis-aligning the transmitter 42 and sensor 44 with the air flow through the filter 12.

In some embodiments, the mis-alignment angle of the transmitter 42 and sensor 44 may be adjusted based on the characteristics of the filter 12 for which the clogging level is to be detected. For example, the characteristics of filter material, filter thickness, and/or filter density may be taken into consideration. Other characteristics that may be taken into consideration for determining the mis-alignment angle of the transmitter 42 and sensor 44 include, but are not limited to, the velocity and direction of air flow, the strength and emitted wavelength of the transmitter 42 and the sensitivity of the sensor 44.

In some embodiments, it is beneficial to increase the acuteness of the mis-alignment angle as much as possible. By increasing the acuteness of the mis-alignment angle, the path of the beam 46 passing through the filter is lengthened. By increasing the path length of the beam 46, a larger area of the filter 12 may have its clogging level detected with a single beam 46 of electromagnetic radiation. This increased detection area assists with determining the overall clogging level of the filter 12. However, when increasing the path length of the beam 46, it may be necessary to adjust the output strength of the transmitter 42 or the sensitivity of the sensor 44. Examples of such adjustment will be described in greater detail below.

The sensor 44 should be positioned in the path of the beam 46 at a point after the beam 46 has passed through the filter 12. This can be accomplished in many ways. For example, the transmitter bracket 50 and the sensor bracket 52 hold the transmitter 42 and the sensor 44 in position, so these brackets 50, 52 are used to position the transmitter 42 and sensor 44. In one embodiment, the sensor 44 is secured on the opposite side of the filter 12 as the transmitter 42. This can be done by either positioning the sensor 44 directly in line with the beam 46 emitted from the transmitter 42, or by positioning one or more reflectors 54 directly in line with the beam 46 emitted from the transmitter 42 such that the reflectors 54 direct the beam 46 to the sensor 44. Alternatively, the transmitter 42 and sensor 44 can be positioned on the same side of the filter 12, and a reflector 54 can be positioned on the opposite side of the filter 12 directly in line with the beam 48 emitted from the transmitter 42 such that the beam 46 is directed to the sensor 44. More than one reflector 54 can be used, if desired. The beam 46 has to pass through the filter 12 at least twice when the transmitter 42 and sensor 44 are on the same side of the filter 12, and this can reduce the overall signal strength reaching the sensor 42. Some filters 12 have an external frame 24 that limits access to the filter top or bottom surface 30, 32, so the transmitter bracket 50 and the sensor bracket 52 can be adjustable so the measurement point 48 can be moved as necessary.

In one embodiment, the reflector 54 can be a retroreflector, and the transmitter 42 and sensor 44 can be positioned very close to each other. In this embodiment, the transmitter bracket 50 and the sensor bracket 52 can be one and the same bracket. The transmitter 42 can be positioned within a housing, and in this embodiment it is possible for the transmitter 42 and the sensor 44 to be positioned in the same housing. The reflector 54 can be secured in place in many ways. Some techniques for securing the reflector 54 include a reflector bracket 58, or the reflector 54 can be secured to the filter receptacle 14, the internal walls of the duct 16, or even directly to the filter 12. Use of a retroreflector type reflector 54, which reflects electromagnetic radiation back to the source of that electromagnetic radiation, can simplify the positioning of the transmitter 42 and sensor 44 because they can be co-located.

The filter detector 40 preferably requires the transmitter 42 to emit a relatively consistent amount of electromagnetic radiation over at least a portion of the life of the filter 12, so the change in the sensor reading 45 is based on accumulated dust on the filter 12 and not on a change in the performance of the transmitter 42. One or more batteries 60 can be used to power the transmitter 42, and they may also be used for operation of the sensor 44 and other components of the filter detector 40 requiring electrical power. If the battery 60 loses power over time, the beam 46 emitted from the transmitter will decrease in strength, and this may indicate the filter 12 is becoming clogged. That means a dying battery 60 will falsely indicate a clogged filter 12, instead of falsely indicating a clean filter 12, and this can call attention to the filter detector 40 for battery changing or charging. In some embodiments, the filter detector 40 will notify the user when the battery 60 loses voltage, such as with an audible sound, a light, or by other techniques. The filter detector 40 can also be powered by alternating current or direct current supplied from sources other than a battery 60, such as power provided by a utility company or from a generator.

The beam 46 can be polarized, and the sensor 44 can include a filter that reduces electromagnetic radiation that is not polarized the same as the beam 46 when the beam 46 reaches the sensor 44. This can reduce interference from outside sources of electromagnetic radiation, such as sunlight, light bulbs, or other sources. Also, the beam 46 can be focused to a narrow beam 46 to increase the amount of emitted electromagnetic radiation that can actually reach the sensor 42, but a more narrow beam 46 requires more accurate placement of the sensor 42 to ensure the sensor 42 is in line with the beam 46. A more narrow beam 46 may be beneficial for more optically dense filters 12, because the relatively stronger signal strength may be necessary to sufficiently penetrate the filter body 26.

In one embodiment, the transmitter 42 can have an aperture diameter of 5 mm. In other embodiments, the aperture diameter of the transmitter 42 can be approximately between 5 mm to 10 mm, but other ranges are also possible. In yet another embodiment, the transmitter 42 can be a laser diode.

Controller for the Transmitter

Figure 6:
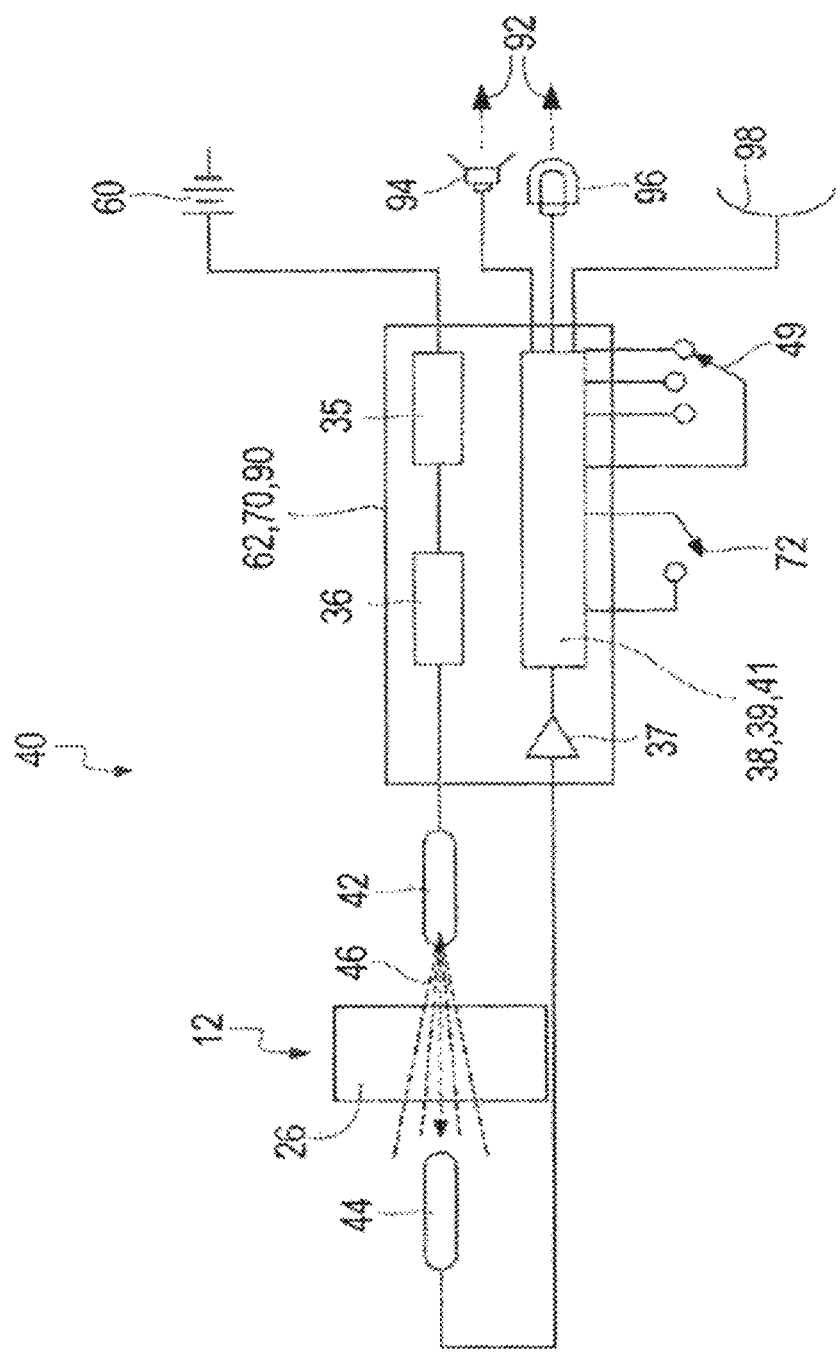
FIG. 6 depicts a schematic diagram of portions of an embodiment of a filter detector.

A controller 62 can be used to control the operation of the transmitter 42. The controller 62 can be electrically connected to the transmitter 42, but it may also be possible for the controller 62 to utilize wireless technology, known to those of skill in the art, to control the transmitter 42. The controller 62 can direct the transmitter 42 to alternate between a transmitting mode 64 and a dormant mode 66, as seen in FIG. 6, with continuing reference to FIGS. 1-5. The transmitter 42 does not transmit significant amounts of electromagnetic radiation during the dormant mode 66. The transmitter 42 emits the beam 46 during the transmitting mode 64, and the transmitter uses far more power during the transmitting mode 64 than during the dormant mode 62. The filter detector 40 can save power, and thereby extend battery life if powered by a battery 60, by using lengthy dormant modes 66 separated by relatively short transmitting modes 64.

In one embodiment, the controller 62 can adjust and vary the length of the dormant mode 66 based on the sensor reading 45 during at least one previous transmitting mode 64. For example, the controller 62 can set the dormant mode 66 for 72 hours if the clogging level 43 indicates the filter 12 is less than 80% clogged, and the controller 62 can change the dormant mode 66 to 24 hours when the clogging level 43 indicates the filter 12 is at least 80% clogged, but not more than 90% clogged. The controller 62 can then change the dormant mode 66 to 6 hours when the clogging level 43 indicates the filter 12 is at least 90% clogged, and the set clogged level 47 may be at a clogging level 43 of 95%. The controller 62 can be set to change the length of the dormant mode 66 when the clogging level 43 reaches one or more preset values. The preset values can vary for many reasons, including different users or different applications, and the preset values can even be adjustable by the user, if desired. There can be any number of different dormant mode lengths based on the clogging level 43, and there can even be an algorithm to continuously adjust the length of the dormant mode 66 based on the clogging level 43, if desired.

A filter 12 tends to clog relatively slowly, so frequent tests are not necessary when the filter 12 is relatively clean. As the filter 12 becomes more clogged, the length of the dormant mode 66 can be shortened so there is not a significant delay between the time when the filter 12 becomes clogged and the time for the filter detector 40 to test the filter 12 for clogging. This can help insure a user is promptly notified when the filter 12 becomes clogged, but also helps save power when frequent testing is not necessary. Power saving can be particularly desirable when the filter detector 40 is battery 60 powered, because it can extend the battery life.

In some embodiments, the length of the dormant mode 66 may be based on the output strength of the transmitter 42. For example, when the output strength of the transmitter 42 is high, the length of the dormant mode 66 may be increased so as to save power. As another example, the length of the dormant mode 66 may be shortened when the output strength of the transmitter 42 is higher, as it may be an indication that the filter 12 has reached a certain clogging level. This may especially be the case when the output strength of the transmitter 42 is increased at some point during the life of the filter 12.

In some embodiments, the length of the dormant mode 66 may be based both on the output strength of the transmitter 42 and the beam 46 absorption percentage by the filter 12 at that particular output strength. In some situations, the beam 46 absorption percentage may be at a level that would indicate a clogged filter for certain types of filters, but other types of filters with the same beam 46 absorption percentage may not have yet reached a clogged filter level. Accordingly, the output strength of the transmitter 42 may be increased during the useful life of the filter. As it is sometimes desirable to only reduce the length of the dormant mode 66 when the filter 12 is nearing being clogged, and the output strength of the transmitter 42 may be insufficient to properly detect the clogging level over the entire range of the filter 12, both the transmitter 42 output strength and the beam 46 absorption level of the filter 12 may be used to determine the appropriate time to modify the length of the dormant mode 66.

Changing the length of the dormant mode 66 can be based on one single sensor reading 45, but the trigger to change the dormant mode 66 can also be more than one consecutive sensor readings 45. Requiring more than one consecutive sensor reading 45 to change the length of the dormant mode 66 can help reduce changes based on a single errant reading. Other parameters can also be used to trigger changes in the length of the dormant mode 66, such as time and user inputs.

The controller 62 can direct the transmitter 42 to emit a plurality of electromagnetic radiation pulses 68 during a single transmitting mode 64, where the pulses 68 are separated by periods of inactivity (referred to as off-times) in the transmitting mode 64. Emitting pulses 68 can have several advantages for the transmitter 42. For example, the periods of off time 69 between pulses 68 can help minimize and control overheating, because the transmitter 42 does not generate heat during periods of off-time. The pulses 68 can also allow a battery 60 to regain voltage, because voltage from a battery 60 can decrease while the transmitter 42 is emitting a beam 46, and then recover during periods of off-time. Pulses 68 can also help reduce "noise" in the sensor reading 45, because the sensor 44 will have several different readings within one transmitting mode 64, and these different readings can be averaged. Background noise will tend to increase or decrease the sensor reading 45 for each individual pulse 68, but averaging the sensor readings 45 for several different pulses 68 tends to reduce the noise, because background noise that increases one reading is cancelled out by background noise that decreases a different reading. Background noise can be further decreased by increasing the number of pulses 68 in a single transmitting mode 64.

In some embodiments, the transmitting mode 64 will be 1 second or less, and there can be 64 to 128 pulses 68 and will include a number of pulses during the transmitting mode 64. The duty cycle during the transmitting mode can be about 50% or less, or even 10% or less in alternate embodiments, where the duty cycle is the ratio of the pulse 68 time to total time during the transmitting mode 64. The total time during the transmitting mode 64 is the sum of the time for the pulses 68 and the off-time. The length of the transmitting mode 64, the dormant mode 66, the number of pulses per transmitting mode 64, and the duty cycle during the transmitting mode 66 can all vary for different filters 12, filter uses, and other design and operation considerations.

In some embodiments, the number of pulses 68 emitted during the transmitting mode 64 may be less than 64 pulses per transmitting mode 64. For instances, 6 or 12 pulses 68 per transmitting mode 64 may emitted. In some embodiments, the number of emitted pulses 68 per transmitting mode 64 may be determined based on the accuracy of the prior readings of the pulses 68. For example, if the accuracy of the reading of the pulses 68 is determined to be sufficiently accurate, then the number of pulses 68 per transmitting mode 64 may be reduced to 6 pulses 68 or fewer per transmitting mode 64, for example.

Processor for the Sensor

A processor 70 can be used to control the sensor 44 and/or measure the sensor readings 45. Depending on the type and characteristics of the sensor 44 used, the processor 70 can direct the sensor 44 when to operate, and the processor 70 can measure the amount of electrical current generated by the sensor 44 and convert that measurement into the sensor reading 45. This can involve various techniques, such as but not limited to amplifying the electrical signal, and converting the electrical signal into a digital value. The processor 70 can be electrically connected to the sensor 44, but the processor 70 (or at least some components of the processor) may be wirelessly connected to the sensor 44. In some embodiments, the processor 70 can communicate with the controller 62, and the processor can limit operation and/or readings from the sensor 44 to periods when the transmitter 42 is emitting a beam 46. This can include limiting operations and/or readings of the sensor 44 to the time of the pulses 68 during the transmitting mode 64. In some embodiments, the processor 70 and the controller 62 are combined in a single housing, and can even use shared wiring, circuits, and other components.

The filter detector 40 can include a calibration switch 72. The calibration switch 72 can be activated when a filter 12 is cleaned or replaced, and this can initiate calibration of the filter detector 40. The calibration switch 72 can also be software activated. The filter detector 40 is calibrated by measuring the sensor reading 45 when the calibration switch 72 is activated, and that sensor reading 45 is saved as the calibration sensor reading 74. As time passes, the filter 12 becomes more clogged, and the sensor readings 45 become smaller because less electromagnetic radiation passes through the filter 12. The subsequent sensor readings 45 are compared to the calibration sensor reading 74 to determine the clogging level 43 of the filter 12. As the difference in the current sensor reading 45 and the saved calibration sensor reading 74 become larger, the clogging level 43 of the filter 12 increases, and the degree of clogging is associated with the clogging level 43 of the filter 12.

In some embodiments, the filter receptacle 14 is open to sunlight or other bright lights when the filter 12 is cleaned or replaced, and sunlight or other bright lights can disrupt the accuracy of a calibration sensor reading 74. In some embodiments, the filter detector 40 and the calibration switch 72 are only accessible when the filter receptacle 14 is open. Therefore, activation of the calibration switch 72 can activate the processor 70 and the controller 62 to test, measure, and record the calibration sensor reading 74 after a set calibration delay time interval has passed. This can give the user time to close the filter receptacle 14 and thereby block unwanted outside interferences during measurement of the calibration sensor reading 74. The filter 12 is still considered freshly washed, new, or freshly changed after the calibration delay time interval has passed, because the calibration delay time interval is small compared to the time necessary for the filter 12 to become clogged.

In some embodiments, there can be more than one calibration sensor readings 74. The processor 70 and/or controller 62 can record a calibration sensor reading 74 when the calibration switch 72 is activated, as well as recording one or more calibration sensor readings 74 after the calibration delay time interval. If more than one calibration sensor reading 74 is measured, the processor 70 or other components of the filter detector 40 can use different techniques to measure, determine, and save the calibration sensor reading 74 used for determining the clogging level 43. These different techniques include, but are not limited to: (i) the average of the various calibration sensor readings 74; (ii) the last of the calibration sensor readings 74; or (iii) when two or more calibration sensor reading measurements are within a set range of each other, the calibration sensor reading 74 can be the average of the sensor readings 45 that are within the set range of each other.

In some embodiments, one or more additional calibration reading may be made during the operating life of the filter 12. The one or more additional calibration reading may be performed for one or more other output strength of the transmitter 42. For example, an additional calibration reading, for instance for a transmitter 42 output strength greater than the one currently being used for determining the clogging level 43, may be taken when the clogging level 43 of the filter 12 is determined to have surpassed a certain threshold. If the calibration reading indicates that the sensor would not be saturated if such an output strength of the transmitter 42 is used, instructions may be provided to subsequently use this output strength for future clogging level 43 readings, as described in greater detail below.

Computer

In some embodiments, the filter detector 40 can include a computer 90, or the filter detector 40 can communicate with a separate computer 90. The computer 90 can be integrated with the controller 62 and the processor 70, or it can be a separate unit, or there may not be a computer 90 at all. Some users have to maintain several different filters 12, and it can become challenging to keep track of all the different filters 12. The processor 70 can transmit sensor readings 45 or clogging levels 43 to a computer 90 to facilitate tracking of several different filters 12. There can be a plurality of processors 70 that transmit sensor readings 45 or clogging levels 43 to the computer 90, and the computer 90 can track the values for each different processor 70 and associated filter 12. The computer 90 can save the calibration sensor reading 74 and calculate the clogging level 43 in place of the processor 70, and the processor steps associated with the calibration sensor reading 74 and clogging level 43 calculations can be equally applicable to the computer 90. The controller 62, processor 70, and computer 90 are all electronic components, and they can share the same housing and even some circuits, memory, or other components, so these components can be difficult to distinguish.

A computer 90 can store and analyze large amounts of data, and this can aid in maintaining filters 12. For example, the computer 90 can: (a) track and graph clogging levels 43 for a filter 12; (b) record HVAC or other filter maintenance, and compare the maintenance history to other filters, manufacturer recommendations, or other factors; and (c) record changes in operation or settings for the filter detectors 40. A computer 90 can integrate filter maintenance and record keeping into a more complete maintenance record keeping system, and can be used to maintain records for insurance purposes. Detailed records can help control costs by allowing a user to select the most cost-effective filter 12, or to compare clogging level 43 to energy associated with a particular filter 12 to determine the most cost effective maintenance practices. The processor 70, controller 62, and computer 90 can communicate wirelessly or by hardwire, and it is even possible to integrate the processor 70 and/or controller 62 and/or computer 90.

In some embodiments, the filter detector 40 or the computer 90 can send notices 92 to the user. The notices 92 can be sent when a filter 12 becomes clogged, or based on almost any other trigger point desirable. The processor 70 or computer 90 can determine a filter 12 is clogged when the clogging level 43 reaches a set clogged level 47, and in some embodiments the set clogged level 47 can be adjusted by the user with the alarm sensitivity adjustment 49. In some embodiments, a notice 92 will only be sent if there are a plurality of consecutive readings that reach a set clogged level 47. This can reduce false notices 92 based on a bug or other debris temporarily being in the path of the beam 46. If a set clogged level 47 is met in one reading, but the next reading shows a clogging level 43 below the set clogged level 47, the requirement for a notice 92 is reset to require two or more consecutive readings that reach the set clogged level 47.

The notice 92 can be simple, such as a light that flashes and/or an audible signal such as a beeping sound when the filter 12 becomes clogged. This simple notice 92 can be local to the filter detector 40, or remote, as desired. In other embodiments, the notice 92 to the user can be more complex. For example, the notice 92 can be a text message, an e-mail, a telephone call, a radio call, a page, or other types of communication that notifies the user that a filter 12 is clogged, or that recommended maintenance is due, or any other notice 92 that is desirable to the user. The notices 92 can include an indication or label identifying the filter 12 requiring attention (such as the filter 12 with a clogging level 45 that has reached the set clogged level 47), as well as other information such as the last time maintenance was performed, the type of filter 12 required, the time span the filter 12 has been in service, and recorded notes relating to tools or special considerations for a particular filter 12.

Figure 7:
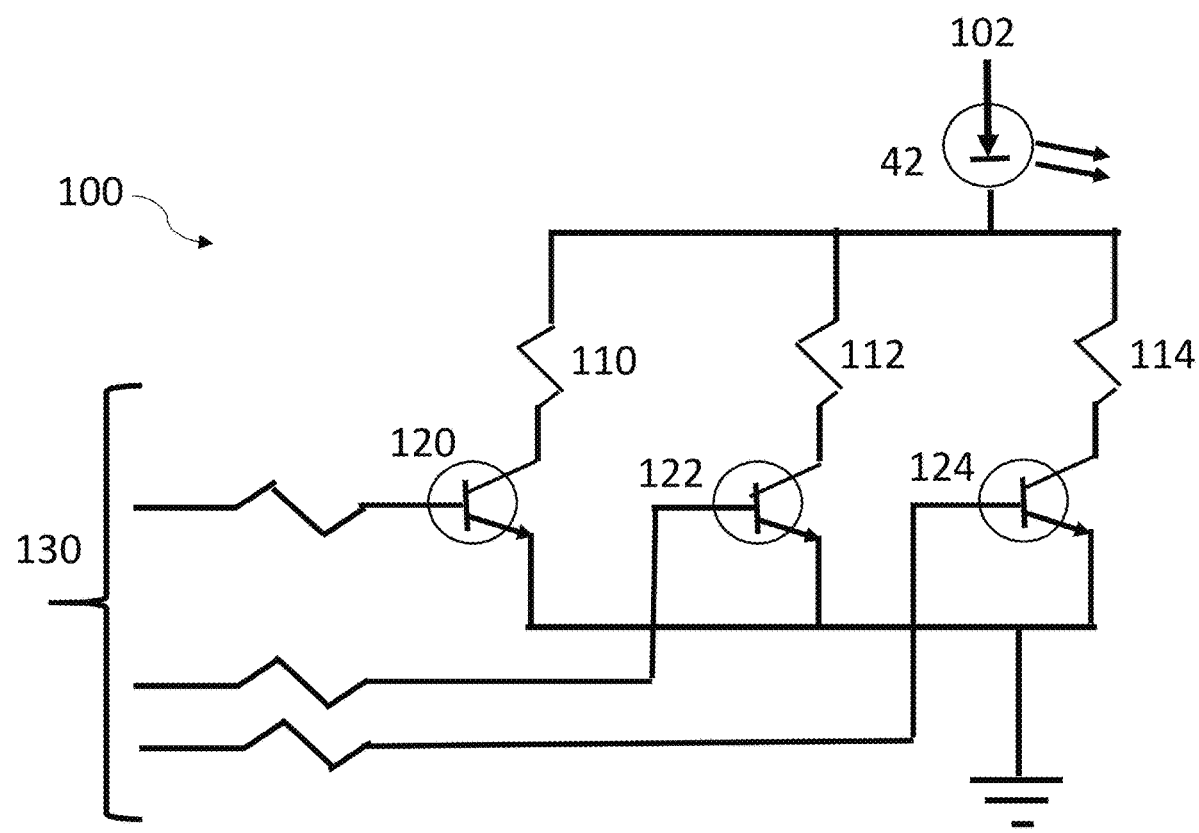
FIG. 7 depicts an embodiment of a circuit diagram of a transmitter resistor array.

One embodiment of the filter detector 40 is shown in FIG. 7, with continuing reference to FIGS. 1-6. This shows the controller 62, the processor 70, and the computer 90 located within the same housing, so the controller 62, processor 70, and/or computer 90 can be different parts of one electronics module. In this embodiment, the controller 62 comprises a voltage regulator 35 and a pulse generating switch 36, and the transmitter 42 is a light emitting diode (LED). The beam 46 passes through the filter 12 and strikes the sensor 44, which is a photo diode in this embodiment. The processor 70 comprises an amplifier 37, and a combined analog-digital converter 38, microprocessor controller 39, and digital storage chip 41 are also part of the processor 70 and/or the computer 90. This shows the calibration switch 72 and the alarm sensitivity adjustment 49, as well as a speaker 94, a light 96, and a radio transmitter 98 to send notices 92 to the user. Other embodiments are also possible.

Biased Resistors

Figure 14:
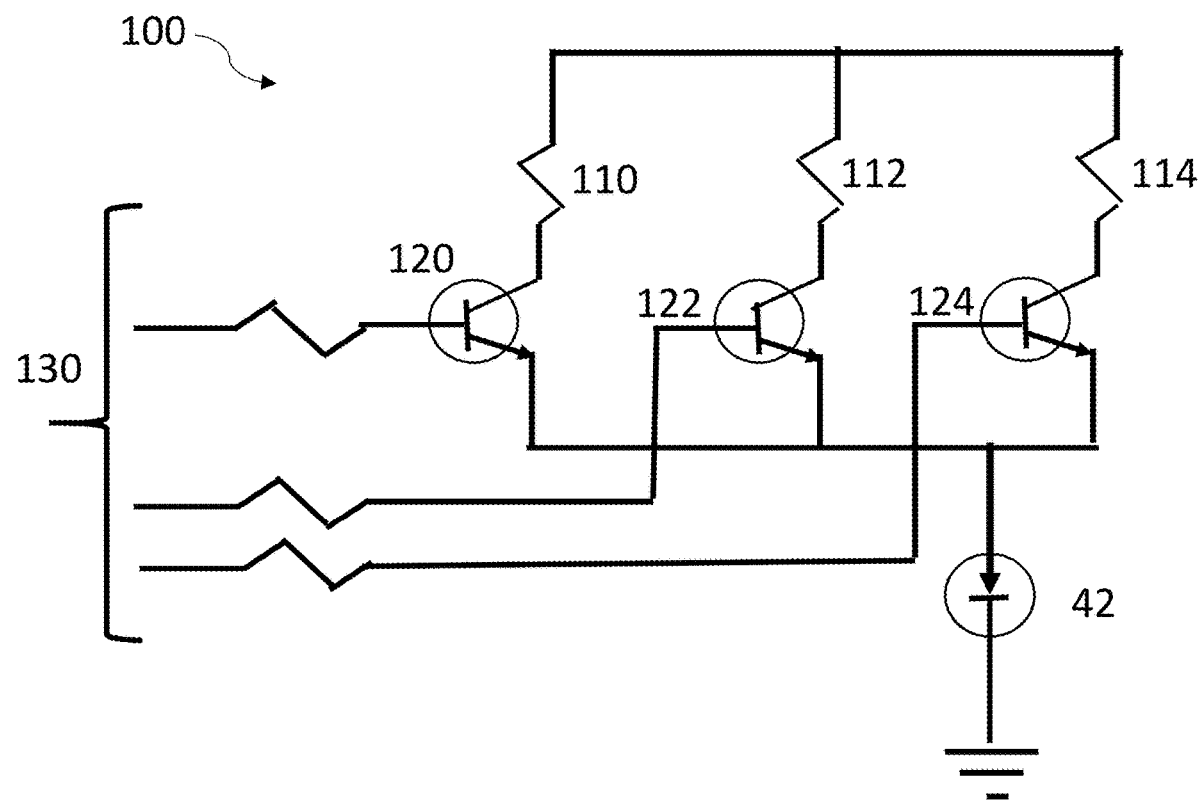
FIG. 14 depicts an embodiment of a circuit diagram of a transmitter resistor array.

In some embodiments, a transmitter resistor array 100 may be electrically connected to the transmitter 42. Some embodiments of the transmitter resistor array 100 is depicted in FIGS. 7 and 14.

In some embodiments, the transmitter resistor array 100 may be configured to control the output strength of the transmitter 42 utilizing a plurality or resistors 110, 112, 114. Although three resistors 110, 112, 114 are depicted in FIG. 7, fewer or more resistors may be included based on various anticipated operating parameters, such as filter 12 thickness, clogging level tolerance, transmitter 42 and sensor 44 strength, and filter 12 construction materials. In this particular embodiment, resistor 110 is 5 ohms, resistor 112 is 50 ohms, and resistor 114 is 500 ohms. However, other types of resistors may be used, including but not limited to variable resistors.

In some embodiments, the transmitter resistor array 100 may include one or more controlling transistor. For example, the number of controlling transistors 120, 122, 124 may correspond to the number of resistors 110, 112, 114. However, in other embodiments, the number of controlling transistors may differ from the number of resistors.

In some embodiments, the controlling transistors 120, 122, 124 may be controlled by a processor 130. The processor 130 may be integrated into processor 70 or may be separately formed. Upon receiving instructions, the processor 130 may control one or more of the controlling transistors 120, 122, 124 so as to allow the transmitter supply voltage 102 to flow through the transmitter 42 and one or more of the resistors 110, 112, 114. Alternatively, the transmitter resistor array 100 may provide the supply voltage and the resistors 110, 112, 114 may impede the current before it passes through the transmitter 42. By adjusting the flow through the various resistors, the output strength of the transistor 42 may be controlled.

Figure 8:
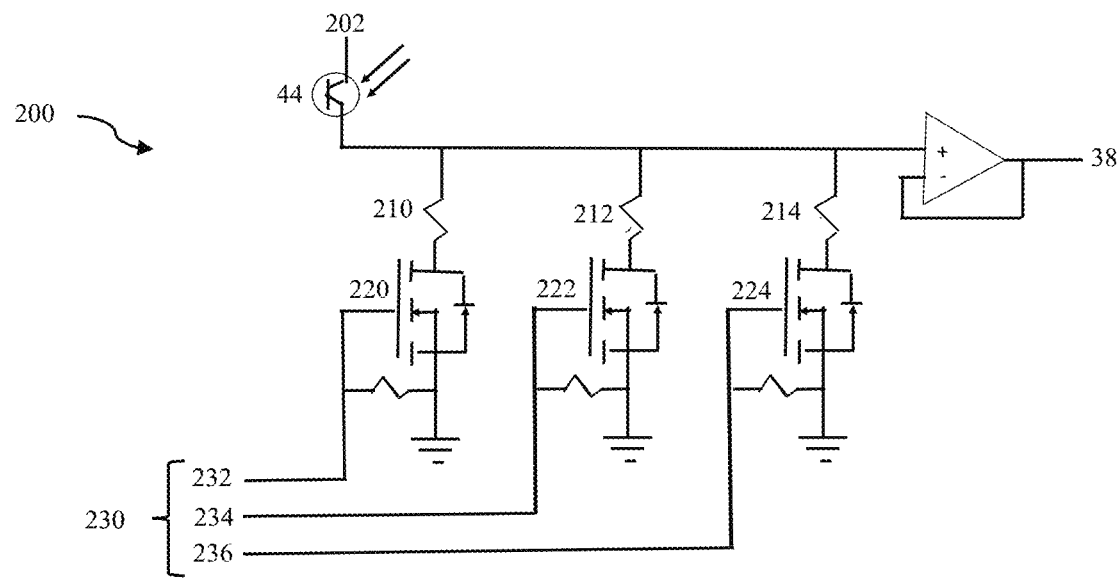
FIG. 8 depicts an embodiment of a circuit diagram of a sensor resistor array.

In some embodiments, a sensor resistor array 200 may be electrically connected to the sensor 44. An embodiment of the sensor resistor array 200 is depicted in FIG. 8.

In some embodiments, the sensor resistor array 200 may be configured to controllably attenuate the output of the sensor 44 to the analog-to-digital converter (ADC) 38. For example, this attenuation may be realized by selectively activating one or more resistor, such as resistors 210, 212, 214. Although three resistors 210, 212, 214 are depicted in FIG. 8, fewer or more resistors may be included based on various anticipated operating parameters, such as clogging level tolerance, transmitter 42 and sensor 44 strength, and filter 12 construction materials. In this particular embodiment, resistor 210 is 100 ohms, resistor 212 is 1,000 ohms, and resistor 214 is 10,000 ohms. However, other types of resistors may be used, including but not limited to variable resistors.

In some embodiments, the sensor resistor array 200 may include one or more controlling transistor. For example, the number of controlling transistors 220, 222, 224 may correspond to the number of resistors 210, 212, 214. However, in other embodiments, the number of controlling transistors may differ from the number of resistors. In some embodiments, the transistors 220, 222, 224 may be MOSFETs, however other types of transistors may also be implemented.

In some embodiments, the controlling transistors 220, 222, 224 may be controlled by a processor 230. The processor 230 may be integrated into processor 70 or may be separately formed. Upon receiving instructions, the processor 230 may send a current through one of the processor outputs 232, 234, 236 to control one or more of the controlling transistors 220, 222, 224 so as to attenuate the output signal from the sensor 44 powered by supply voltage 202 based on the resistance of the activated resistor(s). By attenuating the output signal from the sensor 44, the input strength of the signal to the ADC 34 may also be controlled.

In some embodiments, a calibration reading may be taken after a new or clean filter 12 has been inserted into the HVAC system 10. When taking a calibration reading, the beam 46 emitted by the transmitter 42 is passed through the new or clean filter 12 and received by the sensor 44.

In some circumstances, it may be desirable to adjust the transmitter 42 or sensor 44 strength in order to accommodate different types of filters 12 and/or different tolerances to clogging levels. However, it has been discovered that differing internal configurations and materials of a filter 12 substantially affect the amount of the beam 46 that is able to pass through the filter. Accordingly, the amount of the intensity of the beam 46 reaching the sensor 44 may be too much or too little to accurately measure the clogging level of the filter 12. This could be due to such factors as, but not limited to, the sensor 44 being saturated during a calibration reading or the received beam 46 being too weak when the clogging level reaches a certain threshold indicating the filter is clogged, despite the filter 12 not actually being clogged.

In some embodiments, the strength of the transmitted beam 46 is adjusted using the transmitter resistor array 100. During the calibration reading, the transmitter resistor array 100 may adjust the strength of the beam 46 being emitted by the transmitter 42. A calibration reading may be taken at any or all the emitted strengths of the beam 46. During the calibration reading, the sensor 44 may detect and record the strength of the beam 46 passing through the filter 12. The detected and recorded strength of the beam 46 may then be linked to the strength of the emitted beam 46 from the transmitter 42 and/or the resistor or resistance level used by the transmitter resistor array 100 to adjust the strength of the strength of the emitted beam 46.

The processor 70 may then determine the calibration level and the desirable output strength of the transmitter 46. More specifically, the processor 70 may be configured to determine a sensor saturation level of the sensor 44 based on the detected and recorded strength of the beam 46 during the calibration reading. For example, the detected and recorded strength of the beam 46 during the calibration reading and corresponding to each of the resistance levels of the transmitter resistor array 100 may be compared to a stored value that relates to the maximum saturation level of the sensor 44. Based on the comparison between the saturation level related to the detected and recorded strength of the beam 46 during the calibration reading and the maximum saturation level of the sensor 44, the processor 70 may determine the highest saturation level that does not reach the maximum saturation level of the sensor 44.

Based on the determination of the highest saturation level, the processor may instruct the transmitter resistor array 100, either directly or indirectly for example via the processor 130, to control the one or more controlling transistor 120, 122, 124 to allow the current to flow through the corresponding resistor 110, 112, 114. Accordingly, the strength of the beam 46 may be calibrated to a level that allows for more accurate readings of the clogging level of the particular installed filter 14, for example by allowing for the largest strength without the issues associated with reaching the saturation level. Additional benefits include, but are not limited to, reducing the power requirements of the transmitter 42 when a greater output strength would result in saturation of the sensor 44.

In some embodiments, one or more calibration reading may be taken after calibration of the clean or new filter 12 has already occurred. For example, one or more calibration reading may be taken when the filter 12 is at least partially clogged. For instance, an additional calibration reading may be taken at regular intervals, irregular intervals, at pre-specified clogging levels of the filter 12, or based on the detected strength of the beam 46 by the sensor 44.

For example, if the one or more additional calibration reading is taken at regular time intervals, the saturation level corresponding to each output strength, as determined by the resistivity of various resistors in the transmitter resistor array 100, may be determined at the specified time interval. The saturation level may then be compared to the maximum saturation level of the sensor 44. When the processor 70 determines that the saturation level corresponding to one of the transmitter 42 output strengths that was previously determined to meet or exceed the maximum saturation level of the sensor 44 no longer meets or exceeds the maximum saturation level of the sensor 44, the transmitter resistor array 100 may be instructed to control the controlling transistors 120, 122, 124 to adjust the resistivity for subsequent filter clogging level determinations. In this way, the output strength of the transmitter 42 may be maintained at as close to the maximum saturation level of the sensor 44, without actually meeting the maximum saturation level of the sensor 44. One of the benefits of increasing the output strength of the transmitter 42 to be as close, without meeting or exceeding, the maximum saturation level of the sensor 44, is that it allows for more accurate results when determining the clogging level of the filter 12.

For example, the one or more additional calibration reading may be taken based on the detected strength of the beam 46 by the sensor 44, for example when the detected strength of the beam 46 falls below a certain threshold. The level at which the threshold is set may be based on certain parameters, for example the materials of the filter 12 being detected or the initial calibration reading. When the detected strength of the beam 46 falls below the threshold, the calibration reading corresponding to a greater output strength of the transmitter 42 may be made. If and/or when the saturation level of the calibration reading indicates that the corresponding greater output strength of the transmitter 42 is below the maximum saturation level of the sensor 44, the transmitter resistor array 100 may be instructed to control the controlling transistors 120, 122, 124 to adjust the resistivity for subsequent filter clogging level determinations. In this way, the sensitivity of determining the clogging level may be increased when it is anticipated that the sensor 44 reading may be lower than would provide accurate enough results. Additionally, by not performing additional calibration readings until the sensor 44 reading level is below a certain threshold, power saving may be realized as superfluous readings are not required.

If additional calibrations reading are taken, it may be beneficial to perform additional processing to ensure the clogging level of the filter is accurately determined in certain embodiments. For example, when the determination has been made that the output strength of the transmitter 42 is to be increased (for instance because the greater strength output is now results in a saturation level below that of the maximum saturation level of the sensor 44), the reading of the sensor 44 based on the new calibration reading and a recently determined clogging level may be linked. In this way, an accurate determination of the clogging level of the filter 12 can be realized, despite switching the output strength of the transmitter 42. Moreover, the clogged filter detector 40 would be better able to determine the clogging level of a filter 12 even when the filter is very dirty.

In some embodiments, power savings may be realized during the additional calibration readings. For example, after performing the initial calibration, the subsequent calibration readings may only need to be taken for one or more of the greater output strengths of the transmitter 42. As another example, calibrations readings may only be taken when the clogging level or the sensor 44 reading reach a certain threshold.

In some embodiments, varying the output strength of the transmitter 42 allows for the clogging level of different types of filters 12 to be accurately determined. For instance, a weaker output strength will be sufficient to be near the maximum saturation point of the sensor 44 if the filter 12 is thinner or less dense. However, a stronger output strength may be necessary to be near the maximum saturation point of the sensor 44 if the filter 12 is made of thicker or more dense materials or if a filter 12 is very dirty. Additionally, including variable output strengths of the transmitter 42 allows for an extended range of clogging levels, as compared to a single output strength transmitter 42. Additionally, selecting the output strength during the initial calibration reading to be that near the maximum saturation level of the sensor 44, more accurate and a wider range of filter clogging levels may be determined.

Although the above has primarily discussed the transmitter resistor array 100, it has been discovered that similar benefits may be realized by utilizing the sensor resistor array 200. Alternatively, both the transmitter resistor array 100 and the sensor resistor array 200 may be utilized to achieve similar benefits as those discussed above.

In some embodiments, information corresponding to the anticipated calibration reading level for a particular type of filter may be stored in memory. This information may be used during a calibration reading in conjunction with the type of HVAC system in which the clogged filter detector 40 is to be installed. Based on the information and the calibration reading, various parameter of the filter can be determined. For example, parameters such as the thickness and potential clogging level of the filter may be determined. These parameters may be used to assist with anticipating when a filter may become clogged.

In some embodiments, the data corresponding to the clogging level of the filter and/or the various calibration readings may be stored in a memory. This data may then be used to determine the anticipated clogging rate and time of a similar filter used in a specific HVAC. The data may also be used to analyze how different environmental factors affect the clogging rate and time of a filter. This analysis may also be used to determine if other types of filters result in better results. The data from analyzing the filters may also be used in conjunction with other data, such as energy draw by the HVAC system and air quality, to determine if certain types of filters are more economical or better suited for certain uses. Still further, the data may be used to determine if other environmental changes have resulted in better air quality or increased life of the filter, and to help analyze whether such environmental changes are economically worthwhile based on useful life and quality of the filter.

Potentiometer

In some embodiments, the output of the sensor 44 is non-linear, for example when the sensor is a photodiode. When the output of the sensor 44 is non-linear, some trip points associated with the sensor 44 would also be non-linear. For instance, the trip point for triggering an alarm using devices such as a potentiometer could be non-linear. However, many potentiometers are linear. Accordingly, when a user wants to adjust the tripping point using a linear potentiometer, the user must recall the linear to non-linear relationship. However, it has been discovered that users typically do not recall this relationship and find it unintuitive to adjust the tripping point. For example, users have found it unintuitive that rotating (for example by 10 degrees) a linear potentiometer to adjust the tripping point associated with a signal received from a photodiode in one direction would result in only a small amount of change, while rotating the linear potentiometer in the other direction by the same amount would result in a much larger change. Accordingly, users have found it difficult to utilize a linear potentiometer to adjust the tripping point due to the differences in sensitivity adjustment.

In some embodiments, a linear potentiometer may be replaced with a logarithmic potentiometer. Alternatively, a logarithmic preamp may be positioned between the sensor 44 output and an ADC 38 input. However, these solutions may not be ideal as logarithmic potentiometers and a preamp with an adequate dynamic range and accuracy may be too expensive.

A less expensive linear potentiometer has uncertain endpoints and does not provide a precise output compared to position. In some embodiments, 7 positions between the ends of pot travel are identified [in this case −120 deg to +120 deg: i.e., full counter-clockwise (CCW) to full clockwise (CW)]. These positions may be labeled such that position 6 is at full CCW, position 0 at full CW, and position 3 at approximately halfway therebetween. Positions 5 and 4 are between 6 and 3 and positions 1 and 2 are between 0 and 3. In this example, position 6 may provide the earliest alarm (for instance, alarms with a small amount of dust on a cheap filter) and position 0 provides a delayed alarm with more dust on a more expensive filter. Position 3 provides midway sensitivity and positions 5 and 4 would provide relatively early alarms. Although providing fixed positioning for a linear potentiometer would provide greater certainty to the user of the anticipated alarm level, users have still found it unintuitive to adjust the non-linear tripping point of the alarm.

Accordingly, it has been discovered that the linear output of the potentiometer can be converted on a logarithmic scale so as to match the logarithmic nature of the output of the sensor 44, and accordingly the logarithmic nature of the tripping point of the alarm. In some embodiments, the linear output of the potentiometer can be converted to the logarithmic scale by using one or more look-up table, for instance stored in s memory of a microprocessor. More specifically, each of the fixed positions of a linear potentiometer may be identified in a log look-up table, so that the motion of the linear potentiometer may be converted to a logarithmic value. Utilizing this solution includes such benefits as allowing a uniform method of adjusting sensitivity, such that the potentiometer is uniform over the operating range, and adds no hardware costs to the overall cost of the device.

In some embodiments, the potentiometer may be manually controlled. In other embodiments, the potentiometer may be digitally or electromechanically controlled. For example, the potentiometer may be digitally or electromechanically controlled so that the user does not need to physically interact with the potentiometer in order to change the sensitivity of the alarm.

In some embodiments, the potentiometer may only be electrically activated once the filter clogging level reaches a certain threshold and/or the output strength of the transmitter has reached a certain level. For example, the potentiometer may only be activated after the filter clogging level reaches a point near, but below, the set clogged level 47. As another example, the potentiometer may only be activated once the output strength of the transmitter 42 has been increased as compared to the strength at the time of initial calibration of the filter 12 or after the strength of the transmitter 42 has reached its maximum output strength.

EXAMPLES

In one embodiment of the present invention, the transmitter 42 can be an infrared light emitting diode (LED). It may beneficial to match the frequencies of electromagnetic radiation emitted by the (LED) transmitters 42 with the sensor 44, which can be a silicon receiver. The frequency matching provides increased optical efficiencies over filter detectors 40 in which the peak transmitter frequency and the strongest sensor receiving frequency do not match, such as with an LED transmitter 42 which transmits in the red visible range and a sensor 44 with a peak receiving efficiency in the near infrared. In some embodiments, the filter detector 40 works best when the peak relative LED transmitter output intensity is a near match to the peak relative sensor sensitivity.

Another aspect of certain embodiments relates to sensitivity improvements involving transmitted beam width (i.e., beam dispersion) and sensor field-of-view. For a point source, the transmitted beam width between half power points is approximately $\lambda/D$, where $\lambda$ is the electromagnetic radiation wavelength and D is the aperture (diameter) of the transmitter output optic. The transmitter output optic is often a reflective parabolic or spherical surface, or a lens. In one embodiment, the aperture diameter of the transmitter is 5 mm. To take advantage of a relatively tight transmitted beam 46 (low beam dispersion), the transmitter 42 aiming is preferably such that the center of the transmitted beam 46 does not continuously "dance" across (or beyond) the sensor 44. In one embodiment of the filter detector 40, the transmitted beam 46 has over double the output intensity (for example, 130 milliwatts per steradian [mW/SR] versus 60 mW/SR) of other transmitted beams 46 with a wider beam dispersion, and pointing has been tested to be stable within about $\frac{1}{10}$ beam width. Additional gains are achievable with transmitters 42 having more narrow beams 46, or using a laser diode, provided adequate pointing is maintained.

Another embodiment of the present invention relates to the pulsed transmitter format with a low duty cycle that can be used to allow a) the transmitter LED to cool between pulses 68 and b) to provide time for the battery voltage to recover between pulses 68. Likewise, the sensor viewing may be synchronized to match the transmitter pulsing, which decreases background "noise" accumulated by the receiver.

An electrical pulse train can be used to power a transmitter LED, where the transmitter 42 turns the electrical pulse train into pulses 68 of electromagnetic radiation. For simplicity, the electrical pulses 68 and the electromagnetic pulses 68 are given the same reference number 68 because they are directly related through the transmitter 42. The electrical off-times 69 between the pulses 68 during the transmitting mode 64 are also given the same name and reference number as the electromagnetic radiation off-times 69 between pulses 68 during the transmitting mode 64 for the same reason.

Each pulse 68 has a peak voltage which is reached shortly after turn-on. From the peak voltage, the voltage sags until the electrical power is turned off at the end of the pulse 68. A significant off-time 69 allows the battery voltage to recover, and the transmitter 42 to cool, provided the off-time 69 is long relative to the pulses 68. The ratio of the pulse 68 to the total transmitting mode 64 is called the duty cycle. A 10% duty cycle is typically adequate for battery voltage recovery.

Also, as discussed above, the averaging of the sensor readings 45 during each pulse 68 provides an improved signal-to-noise ratio. Therefore, a properly designed pulsed LED transmitter 42 and synchronized sensor 44 offers at least three advantages: (1) batter voltage recovery between pulses 68, (2) transmitter 42 LED cooling between pulses 68, and (3) improved signal to noise ratios from averaging sensor readings 45 from multiple pulses 68. With a 1 millisecond pulse length and a 10% duty cycle, one LED tested by the Applicant accepted up to 0.5 amp current pulses 68. A pulse length of about 1 millisecond used with this tested LED transmitter 42 and a photo-diode sensor 44 also provided adequate time for a relatively low power consuming, relatively low speed (low frequency response) analog-digital converter 38 to acquire and process the sensor reading 45.

Another aspect of the filter detector 40 relates to improved battery lifetime by utilizing variable dormant modes 66 between the active transmitting modes 64. For example, if it is determined that the transmitting modes 64 for filter tests should occur every 12 hours when the filter 12 nears a clogged condition, at the beginning of the measurement sequence (i.e., shortly after the filter 12 has been installed), the dormant mode 66 can be set at some higher threshold, for example, 48 hours. As the filter 12 soils and the (filter) penetrating electromagnetic radiation decreases, test intervals (and the associated dormant modes 66) are decreased until the measured electromagnetic radiation reaches the user preselected set clogged level 47 and the notice 92 is transmitted, which can be activation of a local and/or remote alarm.

As dust accumulates on the filter 12, there is a reduction in radiation from the transmitter 42 which is viewed by the sensor 44. The electrical output of the sensor 44 is reduced logarithmically for a linear accumulation of dust. Layers of Mylar (or paper) of the same thickness can be used to simulate layers of dust accumulating between the transmitter 42 and sensor 44. The layers of Mylar inserted (to partially attenuate the radiation beam) between the transmitter 42 and sensor 44 provide a reducing electrical output as depicted in FIG. 7.

Figure 9:
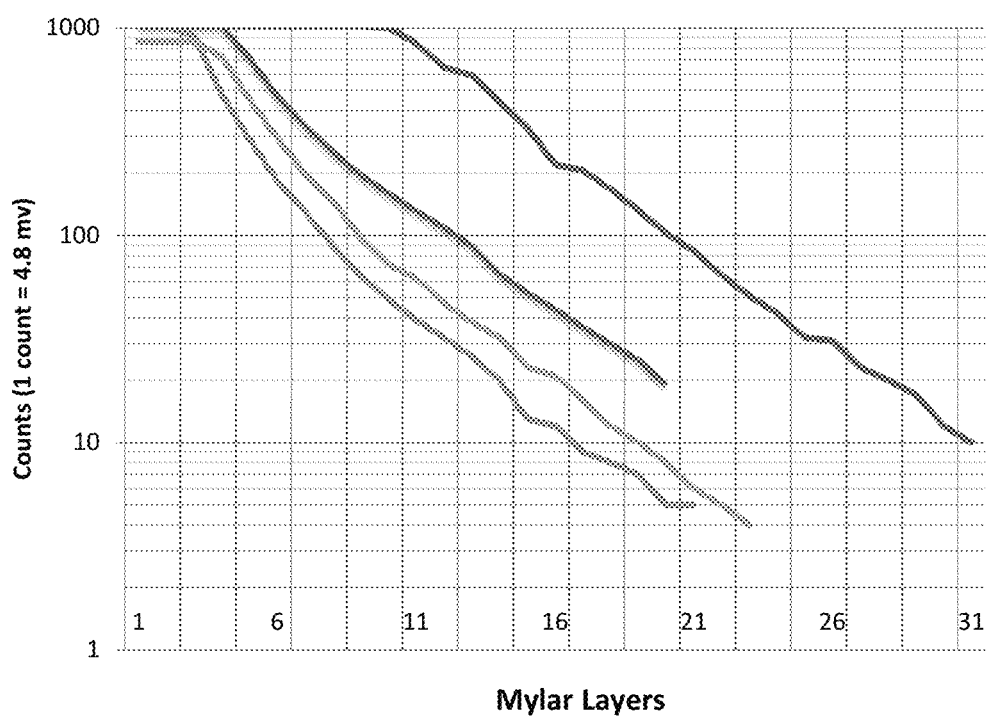
FIG. 9 is a graph of experimental results based on differing transmission strengths and filter thicknesses.

FIG. 9 depicts experimental data corresponding to sensor 44 readings based on the modeled clogging level of a filter 12 and output strength of the transmitter 42. The chart is displayed such that the electrical output of the sensor 44 is presented on y-axis as digital counts (1 count=4.8 millivolts), and the number of layers of Mylar inserted between the transmitter 42 and sensor 44 is presented on the x-axis. In this example, the sensor 44 reaches a maximum saturation level at 1020 counts if the sensor 44 is powered by a DC power source or 870 counts if the sensor is powered by an AC power source.

The left-most and the right-most slopes of FIG. 9 each correspond to testing the same 1 inch thick filter utilizing a battery (DC) powered transmitter 42. However, the differing slopes correspond to the difference in output strength of the transmitter 42, for example using some of resistors 110, 112, 114 of the transmitter resistor array 100. For this experiment, the left-most slope corresponds to implementing a resistivity of 220 ohms and the right-most slope corresponds to implementing a resistivity of 0 ohms. As can be seen from the data, the increased resistivity allows for fewer layers of Mylar to be inserted before the maximum saturation level of the sensor 44 is exited. However, by reducing the resistivity from the transmitter resistor array 100, the clogged filter detector 40 will have strong enough signal to determine the clogging level of a filter 12 when the filter becomes more dirty, as indicated by the increased number of Mylar layers inserted for the right-most slope.

The second from the right slope in FIG. 9 corresponds to data associated with measuring a 5 inch filter and a battery powered clogged filter detector 40. A resistivity of 0 ohms is being provided by the transmitter resistor array 100. When comparing the data of the 5 inch filter with that of the 1 inch filter, it can be seen that a greater output strength of the transmitter 42 is required to detect fewer Mylar layers for the 5 inch filter than the 1 inch filter. Accordingly, when performing an initial calibration reading with these two differing widths of filters, a stronger transmitter output would be required to be near a saturation point of the sensor 44 for the 5 inch filter than for the 1 inch filter.

The second from left slope of FIG. 9 corresponds to data associated with a 1 inch filter and an AC powered transmitter 42. A resistivity of 220 ohms is being provided by the transmitter resistor array 100. As can be seen, although the maximum saturation point of the DC and AC powered sensors 44 are different, the clogging level determination would be approximately the same based on number of inserted Mylar layers.

In FIG. 9, layers of Mylar (or paper) of the same thickness are used to simulate layers of dust accumulating between the transmitter 42 and sensor 44. As dust accumulates on the filter (here represented by layers of Mylar), there is a reduction in radiation from the transmitter 42 which is detected by the sensor 44. As can be seen in FIG. 9, the electrical output of the sensor 44 is reduced logarithmically for a linear accumulation of dust (Mylar layers).

FIG. 10 depict the number of counts based on the number of Mylar stacked layers (0 through 45 layers) inserted in the beam 46 between transmitter 42 and sensor 44 (rows), and the resistivity in ohms supplied used to attenuate the signal output by the sensor by the sensor resistor array 200 (columns).

Figure 11:
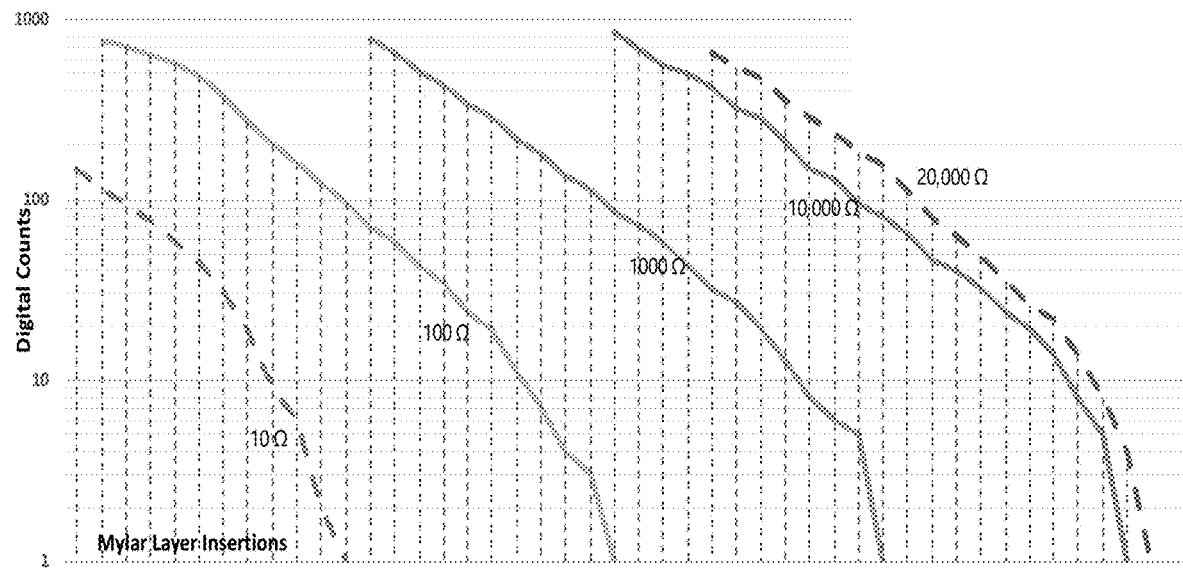
FIG. 11 is a graphical representation of the experimental results of FIG. 10.

FIG. 11 depicts the data from FIG. 10 plotted showing range and sensitivity effects from inserting different bias resistors. More specifically, the y-axis depicts 1 to 1000 digital counts (on a logarithmic scale), and the x-axis depicts the number of Mylar layers inserted between the transmitter 42 and the sensor 44. The different slopes indicate the different resistivities provided to the sensor 44 output signal by the sensor resistor array 200. As noted above, similar results may be obtained utilizing a transmitter resistor array 100, rather than or in combination with, the sensor resistor array 200.

Figure 12:
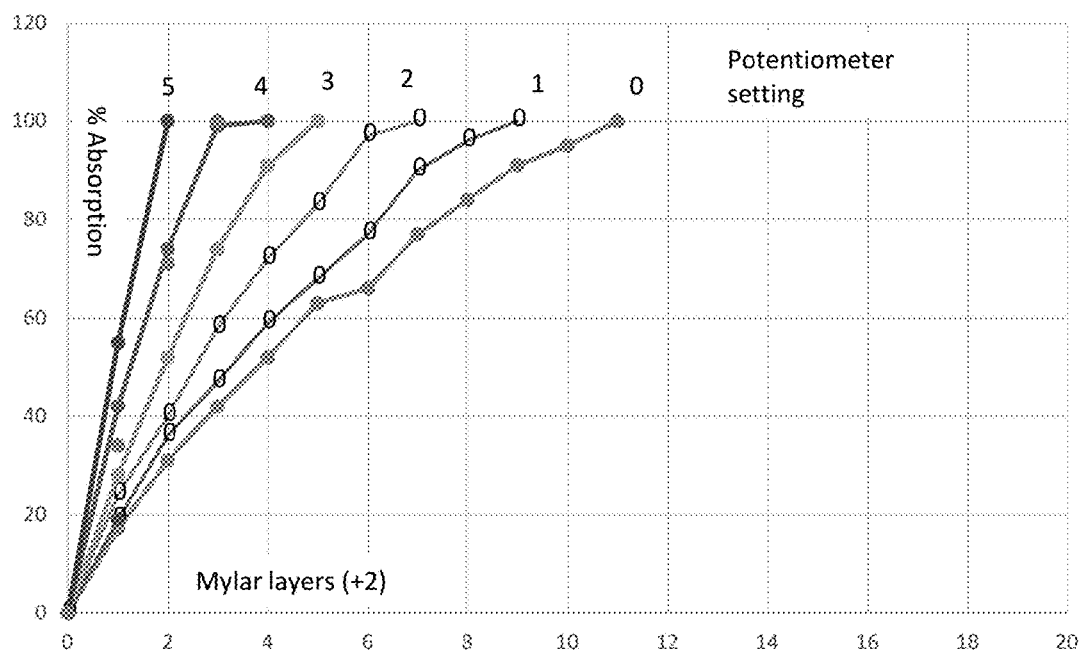
FIG. 12 is a graph showing experimental results of the realized results of an absorption level of a beam of electromagnetic radiation based on an impedance change in a potentiometer.

FIG. 12 depicts the realized absorption percentage of the beam 46 versus the number of inserted Mylar layers between transmitter 42 and sensor 44. Two layers of Mylar were initially inserted between the transmitter 42 and the sensor 44 so as to simulate a thin filter with approximately 1 inch of thickness. Accordingly, the x-axis of the graph represents the number of Mylar layer plus two. Six potentiometer settings corresponding to six alarm settings are depicted from earliest setting 5 to latest setting 0. As can be seen by the graph, the higher settings of the potentiometer result in an earlier sounding of the alarm. More specifically, the clogging level of the filter is indicated as higher based on the realized absorption percentage of the beam due to the potentiometer. Accordingly, for the same filter thickness, an alarm notification would be issued when the filter 12 has a lower clogging level.

Figure 13:
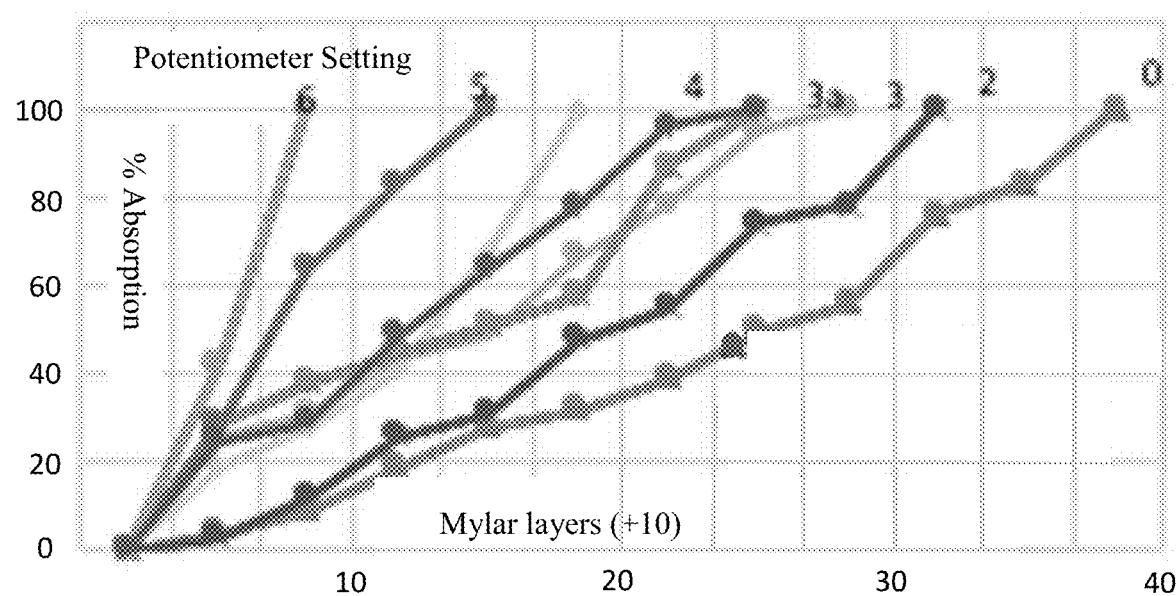
FIG. 13 is a graph showing experimental results of the realized results of an absorption level of a beam of electromagnetic radiation based on an impedance change in a potentiometer.

FIG. 13 depicts the realized absorption percentage of the beam 46 versus the number of inserted Mylar layers between transmitter 42 and sensor 44. Twenty layers of Mylar were initially inserted between the transmitter 42 and the sensor 44 so as to simulate a thick filter with approximately 4.5 inches of thickness. Accordingly, the x-axis of the graph represents the number of Mylar layer plus 20. Seven potentiometer settings corresponding to seven alarm settings are depicted from earliest setting 6 to latest setting 0. As can be seen by the graph, the higher settings of the potentiometer result in an earlier sounding of the alarm. Accordingly, for the same filter thickness, an alarm notification would be issued when the filter 12 has a lower clogging level.

In FIG. 13, the slope between the slopes corresponding to potentiometer levels 4 and 5 simulates a slightly different filter thickness than the other slopes depicted in FIG. 13.

More specifically ten sheets of Post-It® notes were used to simulate a filter, rather than 20 layers of Mylar. Additionally, the potentiometer was set at level 4. As can be seen, the clogging level of differing filter materials may be accurately and consistently determined with similar thickness filters.

While the invention has been described with respect to a limited number of embodiments, those skilled in the art, having benefit of this disclosure, will appreciate that other embodiments can be devised which do not depart from the scope of the invention as disclosed here. Accordingly, the scope of the invention should be limited only by the attached claims.

What is claimed is:

1. A clogged filter detector comprising:
   a transmitter configured to emit a beam of electromagnetic radiation;
   a sensor configured to receive the beam of electromagnetic radiation after the beam passes through a filter; and
   a transmitter resistor array comprising a plurality of resistors, and configured to adjust an output strength of the transmitter by selectively controlling one or more of the plurality of resistors.

2. The clogged filter detector of claim 1, further comprising one or more processor configured to determine a saturation level of the sensor by the beam of electromagnetic radiation after passing through the filter and whether the saturation level is at a saturation point of the sensor.

3. The clogged filter detector of claim 2, wherein the transmitter resistor array is configured to adjust the output strength of the transmitter so that the beam of electromagnetic radiation detected by the sensor is below the saturation point of the sensor.

4. The clogged filter detector of claim 3, wherein the output strength of the transmitter is adjusted during a calibration reading.

5. The clogged filter detector of claim 3, wherein the output strength of the transmitter is adjusted so as to maximize the output strength without resulting saturation of the sensor.

6. The clogged filter detector of claim 2, wherein the transmitter resistor array is configured to adjust the output strength of the transmitter to a highest output strength selected from among output strengths that result in the sensor being below the saturation point of the sensor.

7. The clogged filter detector of claim 6, wherein the one or more processor is configured to associate the selected highest output strength of the transmitter with a clogging level corresponding to a lower output strength of the transmitter selected from among the output strengths that result in the sensor being below the saturation point of the sensor.

8. The clogged filter detector of claim 1, wherein the transmitter resistor array is configured to adjust the output strength of the transmitter during an initial calibration of the filter.

9. The clogged filter detector of claim 8, wherein the transmitter resistor array is configured to adjust the output strength of the transmitter at a time later than the initial calibration of the filter.

10. The clogged filter detector of claim 2, wherein the transmitter resistor array is configured to increase the output strength of the transmitter after the saturation level of the sensor falls below a predefined threshold.

11. The clogged filter detector of claim 10, wherein the transmitter resistor array is configured to increase the output strength of the transmitter to a level which does not result in the saturation level reaching the saturation point.

12. The clogged filter detector of claim 1, further comprising one or more processor configured to determine a saturation level of the sensor receiving the beam of electromagnetic radiation,
    wherein the transmitter resistor array is configured to increase the output strength of the transmitter so as to be below a saturation point of the sensor.

13. The clogged filter detector of claim 1, further comprising one or more processor configured to determine a saturation level of the sensor receiving the beam of electromagnetic radiation after passing through the filter,
    wherein the one or more processor is configured to provide a notification after the saturation level of the sensor falls below a threshold.

14. The clogged filter detector of claim 1, further comprising a potentiometer electrically connected to the sensor output; and
    one or more processor configured to convert a level of the potentiometer to a logarithmic scale.

15. The clogged filter detector of claim 2, wherein the one or more processor is configured to determine the saturation level of the sensor more frequently when the saturation level falls below a predefined threshold.

16. The clogged filter detector of claim 1, wherein the transmitter and the sensor are misaligned along a direction of a flow of air across the filter.

17. The clogged filter detector of claim 1, further comprising a sensor resistor array comprising a plurality of sensor array resistors, and configured to selectively reduce a strength of a signal output by the sensor by selectively controlling one or more of the plurality of sensor array resistors.

18. A clogged filter detector comprising:
    a transmitter configured to emit a beam of electromagnetic radiation;
    a sensor configured to receive the beam of electromagnetic radiation after the beam passes through a filter; and
    a sensor resistor array comprising a plurality of resistors, and configured to adjust the strength of a signal output by the sensor by selectively controlling one or more of the plurality of resistors after the electromagnetic beam passes through the filter.

19. The clogged filter detector of claim 18, further comprising one or more processor configured to determine a saturation level of the sensor receiving the beam of electromagnetic radiation.

20. The clogged filter detector of claim 19, wherein the sensor resistor array is configured to reduce the strength of the signal output by the sensor after the one or more processor determines that the saturation level is at a saturation point of the sensor.

21. The clogged filter detector of claim 19, wherein the sensor resistor array is configured to increase the strength of the signal output by the sensor after the one or more processor determines that the saturation level is below a predefined saturation level.

22. The clogged filter detector of claim 18, wherein the sensor resistor array is further configured to adjust the strength of the signal output by the sensor based on the strength of the beam of electromagnetic radiation received by the sensor.

23. A clogged filter detector comprising:
    a transmitter configured to emit a beam of electromagnetic radiation;
    a sensor configured to receive the beam of electromagnetic radiation after the beam through a filter; and one or more processor configured to adjust an output strength of the beam of electromagnetic radiation based on a saturation level of the sensor.

24. The clogged filter detector of claim 23, wherein the one or more processor is configured to reduce the output strength of the beam of electromagnetic radiation if the sensor is at or above a saturation point.

* * * * *